US005303205A

United States Patent [19]
Gauthier et al.

[11] Patent Number: 5,303,205
[45] Date of Patent: Apr. 12, 1994

[54] VEHICULAR DISTANCE MEASURING SYSTEM WITH INTEGRAL MIRROR DISPLAY

[75] Inventors: Dale R. Gauthier, Cedar; Thomas R. Wayne, Grand Rapids, both of Mich.

[73] Assignee: Trend Tec Inc., Traverse City, Mich.

[21] Appl. No.: 908,267

[22] Filed: Jul. 2, 1992
(Under 37 CFR 1.47)

Related U.S. Application Data

[63] Continuation-in-part of Ser. No. 484,626, Feb. 26, 1990, Pat. No. Des. 340,903.

[51] Int. Cl.⁵ .............................................. G01S 15/00
[52] U.S. Cl. .................................... 367/108; 367/909
[58] Field of Search ................. 367/108, 99, 107, 909, 367/188; 340/435, 436; 219/219

[56] References Cited
U.S. PATENT DOCUMENTS

| | | | |
|---|---|---|---|
| D. 94,715 | 2/1935 | Vail et al. | D12/188 |
| 3,940,822 | 3/1976 | Emerick et al. | 219/219 |
| 4,500,977 | 2/1985 | Gelhard | 367/108 |
| 4,943,796 | 6/1989 | Lee | 340/435 |
| 4,974,215 | 11/1990 | Bolz et al. | 367/108 |

*Primary Examiner*—Daniel T. Pihulic
*Attorney, Agent, or Firm*—Lowe, Price, LeBlanc & Becker

[57] ABSTRACT

A vehicular distance measuring system includes a distance measuring device for detecting a distance to an object and, in response, supplying a distance signal. An ultrasonic transducer mounted in a vehicle taillight or running light assembly is used to ultrasonically detect and range objects in back of, and along side a vehicle in which the system is installed. A display includes (i) a vehicular mirror having an image reflecting surface with a transparent window portion located therein, and (ii) a digital display mounted on the vehicular mirror and viewable through the window portion. The digital display is responsive to the distance signal for displaying the detected distance to the object. The distance measuring device includes a comparator for comparing the distance to the object with a predetermined threshold distance and, in response, supplying a display unblank signal. The digital display is responsive to the display unblank signal for selectively blanking the digital display and displaying the detected distance to the object. The display includes an illumination device such as light emitting diodes (LEDs) responsive to the display unblank signal for illuminating the digital display.

54 Claims, 13 Drawing Sheets

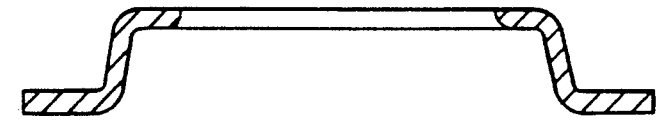
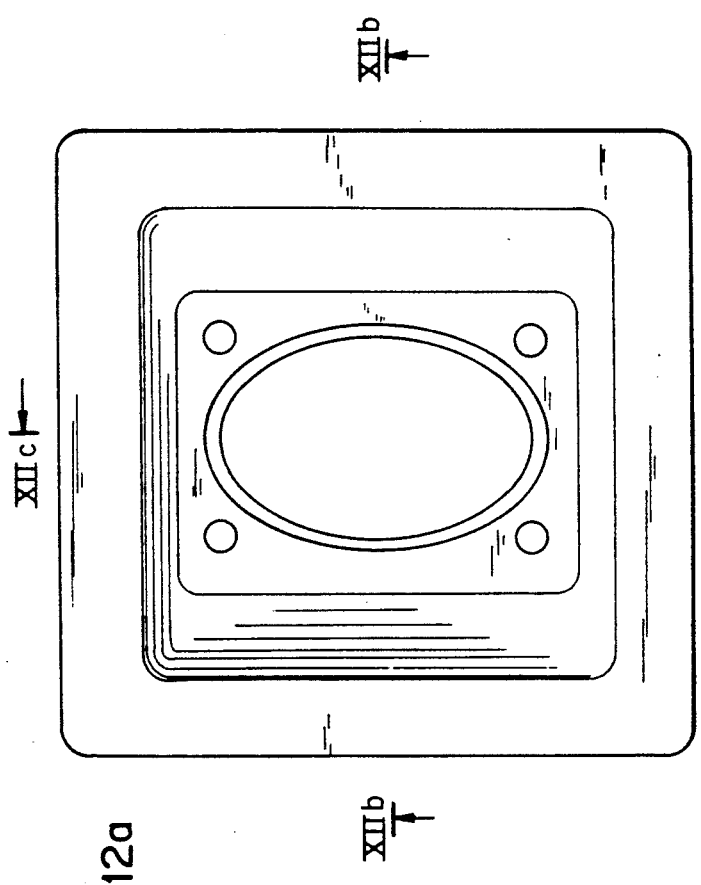
Fig. 12c
Fig. 12a
Fig. 12b

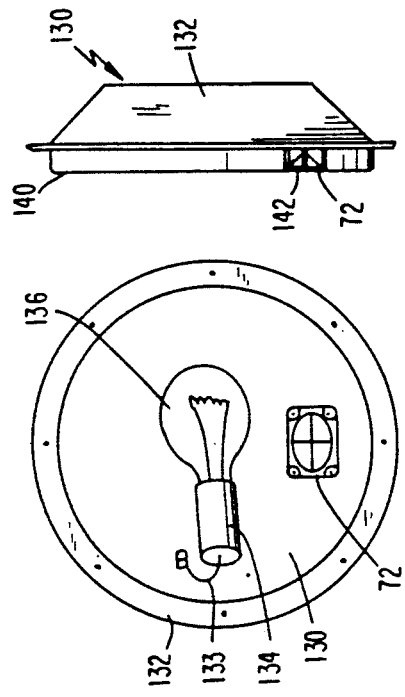
Fig. 13a
Fig. 13b
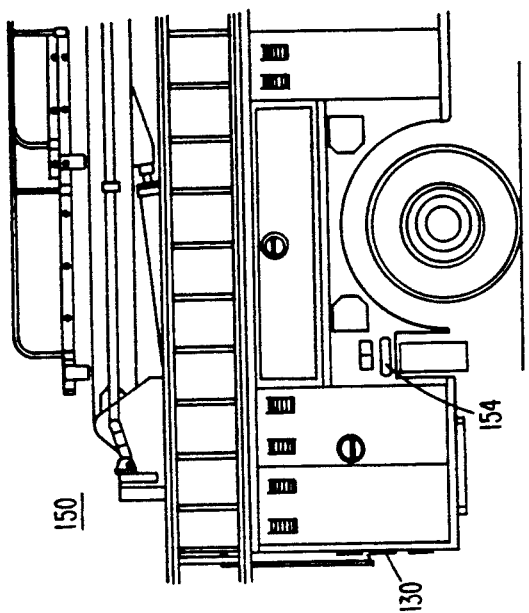
Fig. 14b
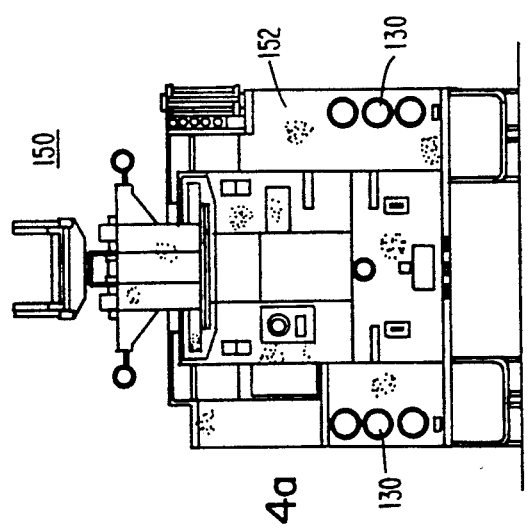
Fig. 14a

| FIG. 16a |
| FIG. 16b |

VEHICULAR DISTANCE MEASURING SYSTEM WITH INTEGRAL MIRROR DISPLAY

This is a Continuation-in-Part application of Ser. No. 07/484,626 filed Feb. 26, 1990, now U.S. Design Pat. No. 340,903.

TECHNICAL FIELD

The system relates generally to electronic distance measuring systems and, more specifically, to an ultrasonic vehicular distance measuring system having a numeric distance display integrated into a vehicle rear view mirror.

BACKGROUND ART

With modern vehicle design provides an operator satisfactory forward visibility during vehicle operation, vision in side and rear directions is often obstructed. To some extend operator vision is augmented by proper placement of mirrors on the vehicle. However, mirrors do not completely eliminate blind spots. For example, it is difficult to provide a satisfactory view toward the rear of a vehicle using mirrors due to obstructions caused by the body of the vehicle. Operator vision toward the rear of the vehicle is further impeded by the relatively large distance from the operator position to the rear of the vehicle common to tractor-trailer combinations and other large vehicles.

Mirrors further limit visual clues necessary for operator judgment of distance to an obstruction by limiting operator depth perception. This is a particular problem when backing a vehicle when the operator requires accurate distance information to maneuver a vehicle (e.g., a semi-tractor trailer) toward an obstruction such as a loading dock. Because of the relatively large distance between the operator and the rear of the vehicle, smaller obstructions may go unnoticed. This is also true in blind areas one either side of a vehicle where direct driver observation is not possible and mirror systems provide incomplete coverage.

Various systems have been proposed in addition to mirrors to augment operator vision. These systems include visual systems using television cameras and monitors to allow visual observation of areas not viewable through mirrors. Television augmentation is relatively expensive, requires the operator to divert his or her attention from other visual systems, and provides limited clues to determine distance to an obstruction.

Electronic obstruction detecting and ranging systems use ultrasonic, radar and infrared emitters and receivers to bounce energy off an obstruction. The systems measure the time required for the emitted energy to travel to and from the obstruction to determine a distance to the obstruction.

Starke et al. U.S. Pat. No. 4,903,004, incorporated herein by reference, describes a distance measuring and signalling system for a vehicle for measuring distances to obstructions such as behind a vehicle being backed up. An array of transducers are mounted on a support such as a rear bumper of the vehicle. A pulsed signal is timed as it is converted to an ultrasonic wave signal and its echo detected. The calculated distance is displayed on a three digit display mounted on a dashboard of the vehicle. The system includes ultrasonic transmitting-/receiving units, a control unit and a digital display unit.

Tendler U.S. Pat. No. 4,937,796 describes a method and apparatus for providing a voice alert to a vehicle operator. The apparatus uses sonar to detect a distance from the rear of a vehicle to a structure such as a loading dock to which the vehicle is being backed. A device converts a detected range into an audible call out of the distance from the back of the vehicle to the structure.

Naruse U.S. Pat. No. 4,674,073 describes an apparatus for use in a vehicle for ultrasonically locating and ranging an object in relation to the vehicle. A plurality of ultrasonic transmitting and receiving elements are alternately arranged in a linear array and sequentially activated to detect and locate an object. A digital display shows the location and distance to a detected object.

Chev U.S. Pat. No. 4,626,850 describes an apparatus for use in a vehicle for ultrasonically locating and ranging an object in the vicinity of the vehicle. An ultrasonic transducer is rotated in azimuth to scan an area for objects. Audio and visual display of distance and direction to a detected object are provided.

Lee U.S. Pat. No. 4,943,796 describes a display unit attachable to an inside rear view mirror of an automobile for displaying distance to an object behind the vehicle using ultrasonic sensors.

While the prior art describes ultrasonic detection and ranging devices, conventional visual distance displays require the vehicle operator to divert attention away from other systems to observe the device display. Although Lee describes a display mounted on an inside mirror so that a distance display is observable near the mirror, the system still requires the vehicle operator to divert his or her vision from the mirror to the attached display. Further, this latter system is not usable with tractor-trailer combinations not having an inside rear view mirror.

Accordingly, an object of the invention is to provide an vehicular digital distance display system for providing precise obstruction distance information to an operator without requiring the operator to divert attention away from other visual systems.

Another object of the invention is to provide an digital distance display system usable with tractor-trailer combinations and other vehicles having an obstructed rear view.

Another object of the invention is to provide a digital distance display system which minimizes operator distraction until an obstruction is detected within a predetermined hazard or threshold range.

Another object of the invention is to provide a non-obtrusive vehicular mount for a distance measuring sensor.

DISCLOSURE OF THE INVENTION

According to one aspect of the invention, a vehicular distance measuring system includes a distance measuring device for detecting a distance to an object and, in response, supplying a distance signal. A display includes (i) a vehicular mirror having an image reflecting surface with a transparent window portion located therein, and (ii) a digital display mounted on the vehicular mirror and viewable through the window portion. The digital display is responsive to the distance signal for displaying the detected distance to the object.

According to another aspect of the invention, the distance measuring device includes a comparator for comparing the distance to the object with a predetermined threshold distance and, in response, supplying a display unblank signal. The digital display is responsive to the display unblank signal for selectively blanking the digital display and displaying the detected distance to the object. The display includes an illumination device such as light emitting diodes (LEDs) responsive to the display unblank signal for illuminating the digital display.

According to a feature of the invention, the distance measuring device includes an ultrasonic transmitter and receiver, a timing circuit and a distance calculating processor. The ultrasonic transmitter is responsive to a transmit signal for emitting an ultrasonic wave. The ultrasonic receiver receives a reflected ultrasonic wave and, in response, supplies a received signal. The timing circuit measures a time period between the emission of the ultrasonic wave by the ultrasonic transmitter and reception of the reflected ultrasonic wave by the ultrasonic receiver. In response to the measured time period, the distance conversion processor supplies the distance signal to the display.

According to a feature of the invention, the ultrasonic transmitter and receiver are contained within a vehicle light assembly such as a taillight assembly. The taillight assembly includes a shell with a bulb or other light emitting means mounted in the shell for supplying an externally perceptible visible light. A lens is secured to the shell for transmitting the visible light and the ultrasonic wave.

According to another feature of the invention, the digital display includes a binary-coded-decimal (BCD) decoder receiving the distance signal and, in response, supplies a display driver signal. A numeric display is responsive to the display driver signal for displaying the detected distance to the object. The numeric display may comprise a pair of seven-segment liquid crystal displays (LCDs) or light emitting diodes (LEDs.) The display includes a mount for attaching the display to an outer portion of a vehicle.

According to another feature of the invention, a heater is provided to electrically heat the vehicular mirror to defrost and/or defog the mirror and the display.

According to another aspect of the invention, a vehicular distance measuring system includes a distance measuring device having (i) a first sensor channel for detecting a distance to an object located in a first space and, in response, supplying a first sensor signal, and (ii) a processor responsive to the first sensor channel for supplying a first distance signal. A distance display system includes (i) a vehicular rear view mirror having an image reflecting surface and a first transparent window located in a portion of the image reflecting surface, and (ii) a first numeric display mounted on the vehicular rear view mirror. The numeric display is visible to a vehicle operator through the first transparent window and is responsive to the first distance signal for displaying the detected distance to the object to the operator.

The processor supplies an unblank display signal to the numeric display in response to detecting the object within a predetermined distance, the first numeric display being responsive to the unblank display signal for selectively blanking and displaying the detected distance.

According to a feature of the invention, the distance display system includes a display illumination device responsive to the unblank display signal from the distance measuring means for illuminating the numeric display. The first numeric display may be selectively blanked in response to the unblank display signal in response to a detected distance greater than the predetermined distance while displaying a detected distance less than the predetermined distance.

According to another aspect of the invention, the vehicular distance measuring system includes a second channel to detect obstructions in a second area distinct from the first. In particular, the distance measuring device includes a second sensor channel for detecting a distance to an object located in a second space and, in response, supplies a second sensor signal. The processor is responsive to the second sensor channel for supplying a second distance signal to a second numeric display device mounted in the vehicle mirror.

According to another aspect of the invention, a combination vehicular light and sensor housing includes a vehicular mountable shell with a light emitting element mounted in the shell for supplying visible light. A lamp socket and bracket are provided for mounting the light emitting element in the shell. A transducer is mounted in the shell spaced from the lamp socket for emitting and receiving a probe signal used to measure a distance. An optically translucent lens is mounted to the shell for transmitting the visible light and the probe signal in a desired direction. Alternatively, the lens may include an aperture through which the probe signal is transmitted and echo signals are received.

According to a feature of the invention, probe signal uses ultrasonic wave energy to detect and range an object. Further, the lens may be in the form of a clear or colored plastic cover substantially transparent to the ultrasonic wave energy and translucent to the visible light. The lens may include a series of concentric ridges forming a Freznel lens.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 9b is a sectional view of the enclosure of FIG. 9a.

FIG. 9c is another sectional view of the enclosure of FIG. 9a.

FIG. 10b is a bottom sectional view of the back panel of FIG. 10a.

FIG. 11b is a bottom view of the mounting bracket of FIG. 11a.

FIG. 11c is a side view of the mounting bracket of FIG. 11a.

FIG. 12a is a front view of an ultrasonic sensor front panel.

FIGS. 12b and 12c are sectional views of the front panel of FIG. 11a.

FIG. 13a is a front view of a vehicle taillight assembly with lens cover removed to show integral ultrasonic transducer installed.

FIG. 13b is a partial sectional view of the vehicle taillight assembly of FIG. 13a with lens cover installed.

FIG. 14a is a rear view of a vehicle with the vehicle taillight assembly of FIG. 13a installed.

FIG. 14b is a partial side view of the vehicle of FIG. 14a.

FIG. 15b is a view of another side of the connection box of FIG. 15a.

BEST MODE FOR CARRYING OUT THE INVENTION

Figure 1:
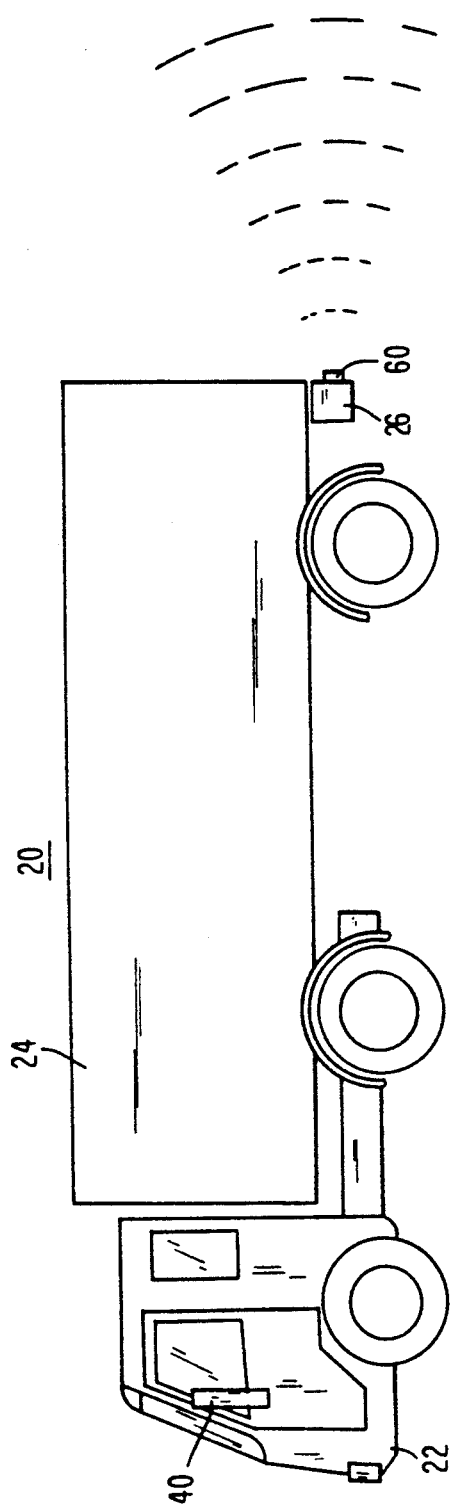
FIG. 1 is a side view of a vehicular distance measuring system according to the invention installed in a vehicle.

Referring to FIG. 1, a vehicle 20 includes a combination of a tractor 22 and trailer 24. A plurality of transceivers 60 functioning as obstruction distance sensors are mounted on a rear bumper 26 of vehicle 20. The transmitters/receivers emit an ultrasonic acoustic energy wave having a frequency of 40 to 50 kiloHertz (kHz) rearward from the vehicle into a detection space immediately behind the vehicle. Mirror display system 40 includes a conventional reflective side view mirror with a digital display mounted thereon. The digital display is visible through a transparent window in the mirror for indicating distance to a detected obstruction.

Figure 2:
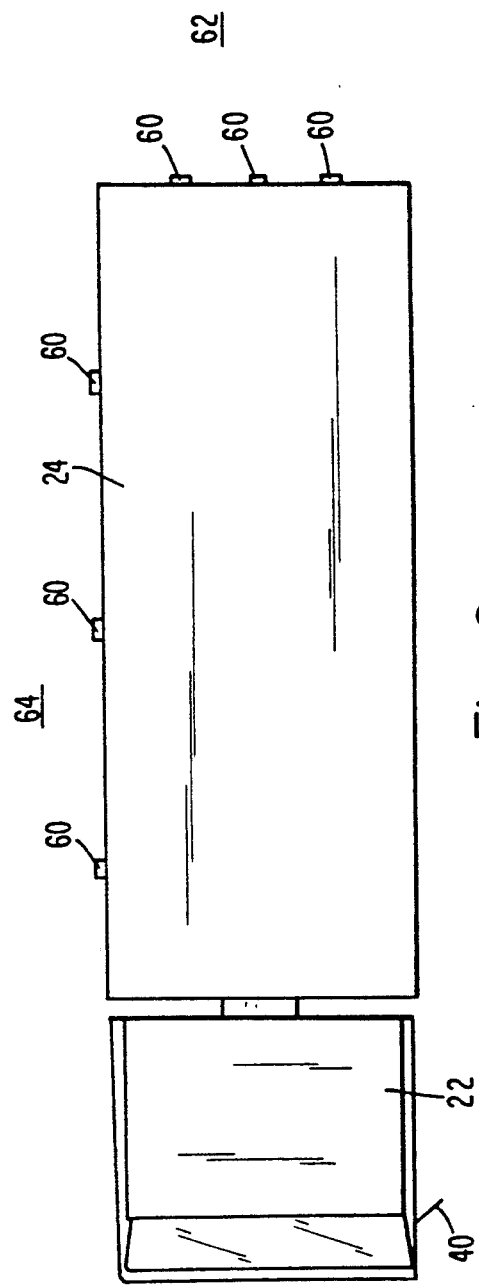
FIG. 2 is a plan view of the vehicle of FIG. 1 including the vehicular distance measuring system according to the invention.

Each transceiver 60 emits ultrasonic acoustic energy in a conical pattern. A linear array 62 of transceivers 60 is mounted along bumper 26 as shown in FIG. 2 to achieve a desired rearward obstruction detection space. The transceiver 60 is wired in parallel to simultaneously emit a pulse of ultrasonic acoustic energy and provide overlapping receive capability of a return ultrasonic echo signal.

Rear array 62 of transceivers 60 in combination with associated processing and control circuitry described below provides complete sensor coverage to detect and provide range information to obstructions located within ten feet of the rear of the vehicle. This information is provided to the vehicle operator by the digital display visible in mirror display system 40 for collision avoidance. For example, the vehicle operator can back vehicle 20 to a bay or dock while visually checking for obstructions in mirror display system 40 and simultaneously observing the distance to the bay or dock indicated by the digital display.

In addition to rear collision avoidance provided by rear sensor array 62, transceivers can be mounted along a side of the vehicle to provide augmented collision avoidance. Side facing sensor array 64 includes three transceivers 60 for detecting obstructions along the right side of vehicle 20. The array is oriented to detect vehicles in a space not readily visible to the vehicle operator and provides distance sensor information to a second channel of the processing and control circuitry for display on a second digital display of mirror display system 40.

Figure 3:
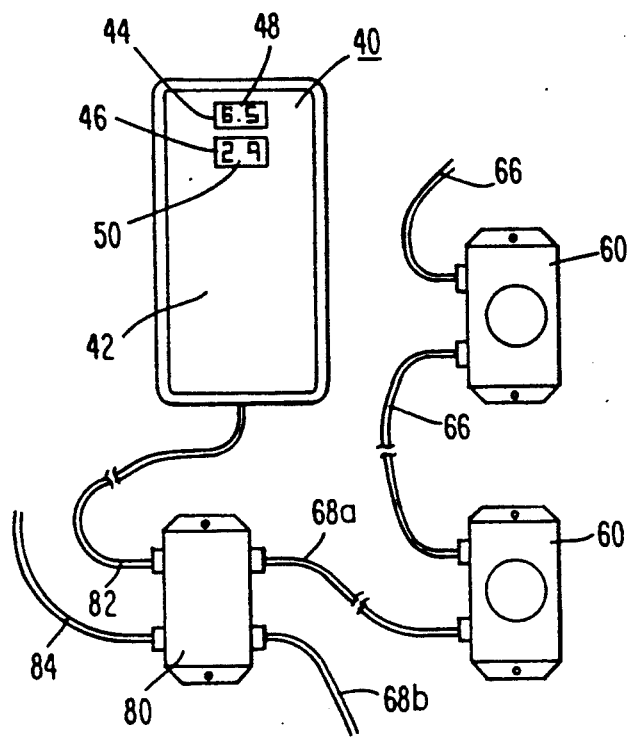
FIG. 3 is a view of major components forming the vehicular distance measuring system according to the invention.
Figures 4, 5:
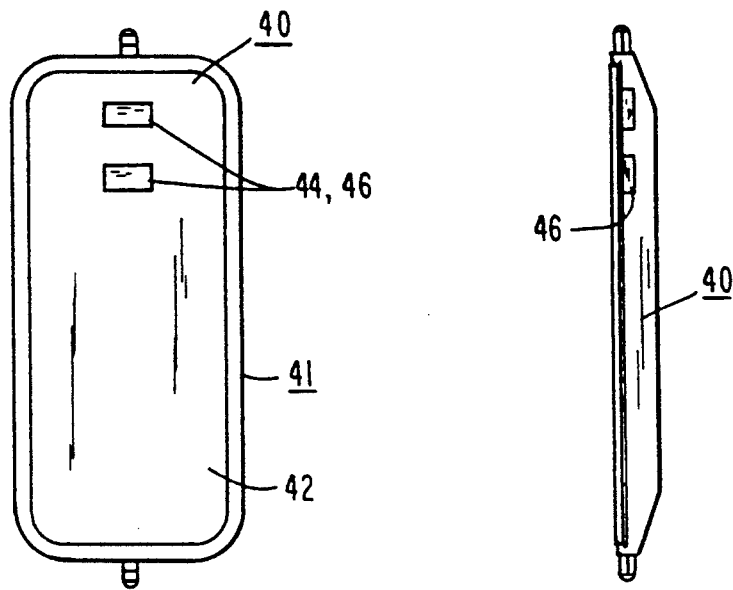
FIG. 4 is a front view of a mirror system according to the invention including a vehicle side view mirror and a pair of integral digital distance displays.
FIG. 5 is a partial sectional view of the mirror system of FIG. 4.

The vehicular distance measuring system includes three major components as shown in FIG. 3: mirror display system 40 with integral digital display, one or more ultrasonic transceivers 60 and connection box 80. Referring to FIGS. 4 and 5, mirror display system 40 includes a reflective "West Coast Style" side view mirror 41, approximately seven inches wide by sixteen inches high with a deep drawn stainless steel back. Mirror element 42 is either first surface chrome or silvered glass sealed in a vinyl channel to prevent component damage and to absorb shock and road vibration. Mirror display system 40 includes one or two back lighted three digit LCD displays 44,46 visible through clear windows in the mirror element. The mirror may be heated to defog or deice the unit.

Connection box 80 supplies power to LCD display 44,46 and back-lights (not shown) and includes circuitry for operating transceiver 60 to detect and calculate a range of obstructions. The connection box includes a conventional microprocess or microcontroller for operating and receiving echo signals from the transceiver 60, calculating a range to a sensed object, comparing the calculated range with predetermined display activation maximum distance values and, in response, activating and supplying range data signals to respective displays 44 and 46.

Connection box 80 accommodates up to two channels of sensor inputs for sensor located on the rear and one side of the vehicle. Each channel controls one or more transceivers 60 for detecting obstructions behind or to one side of the vehicle. Multiple transceiver units provide inputs to a channel to increase lateral coverage of the system. As shown in FIG. 2, multiple transceivers 60 are located along the rear and side of trailer 24 to insure full sensor coverage. The transceiver unit of both channels transmit in parallel to emit ultrasonic acoustic waves. Return ultrasonic echo signals are separately supplied by each group of sensors to the associated channel and separately processes and displayed on a respective LCD display 44, 46.

Ultrasonic transducers constituting transceivers 60 are commercially available, for example, from the Polaroid Corporation. Each unit includes an ultrasonic transmitter for emitting an ultrasonic signal of about 50 kHz and a receiver for sensing a reflection of the emitted signal. The connection box 80 measures the time difference and calculates a distance to a sensed obstruction. If the sensed obstruction is calculated to be within a predetermined distance specified for that sensor channel, the respective LCD display and back light are activated and the distance to the obstruction is displayed.

Ultrasonic transceivers 60 are connected in series or are "daisey chained" by interconnect cables 66 to form a first channel of sensors mounted along the rear bumper of the vehicle in linear array 62. The first channel of sensors is connected by cable 68a to connection box 80 mounted in the cab of the vehicle tractor 22.

Connection box 80 includes a controller for driving transceivers 60 to emit an ultrasonic pulse, receiving a return ultrasonic echo, computing a distance to an obstruction reflecting the ultrasonic wave, and supplying a binary coded decimal (BCD) data signal indicating the computed distance. A second array of ultrasonic transceiver (not shown) forming a second sensor channel is connected to connection box 80 by cable 68b.

Figure 6:
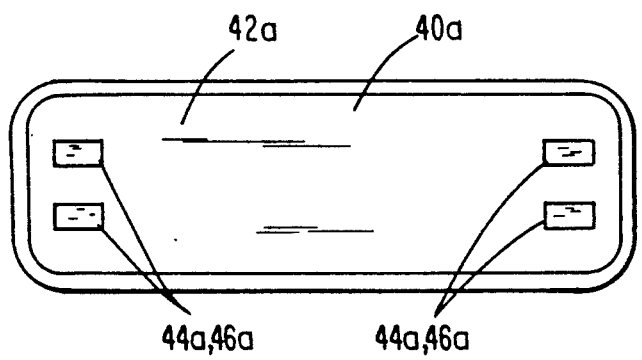
FIG. 6 is a front view of an alternate mirror system according to the invention.
Figure 7C:
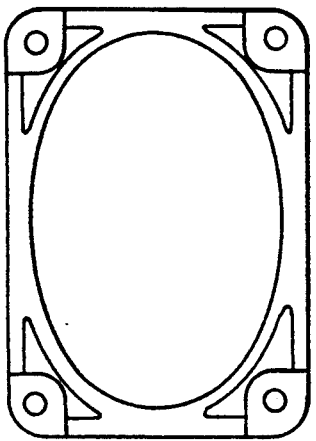
FIG. 7C is a rear view of the ultrasonic transducer of FIG. 7A.
Figure 7B:
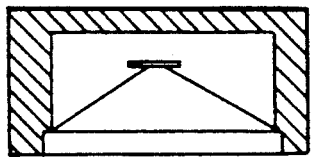
FIG. 7B is a sectional side view of the ultrasonic transducer of FIG. 7A.
Figure 7A:
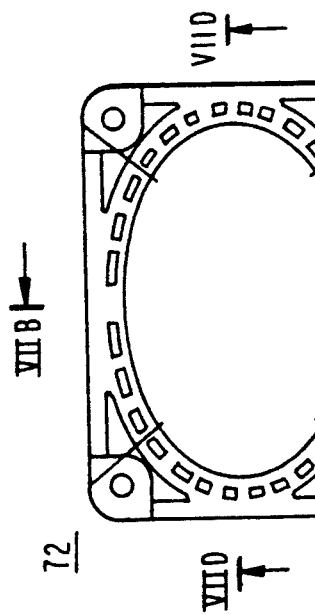
FIG. 7A is a front view of an ultrasonic transducer.
Figure 7D:
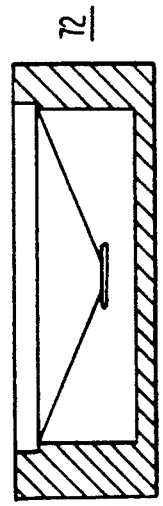
FIG. 7D is a sectional top view of the ultrasonic transducer of FIG. 7A.

An alternative mirror display system 40a for horizontal mounting within a vehicle is depicted in FIG. 6. Multiple LCD displays 44a, 46a are located along opposite side of the mirror element 42a and are visible through transparent windows formed therein.

An ultrasonic transducer 72 is shown in FIGS. 7A-7D. The unit is relatively small in size, measuring approximately 1½ inches wide by 1 inch high by ½ inch deep. The transducer functions as a loudspeaker to emit a pulse of ultrasonic energy and as an electrostatic microphone to receive the reflected signal or "echo." The transducer may be mounted as shown in FIG. 8 to provide a complete ultrasonic transceiver 60.

Figure 8:
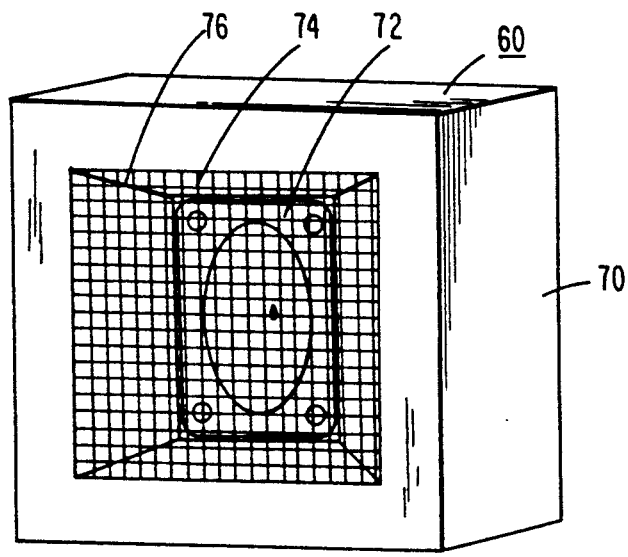
FIG. 8 is a perspective view of a sonic transmitter/receiver unit.
Figure 9C:
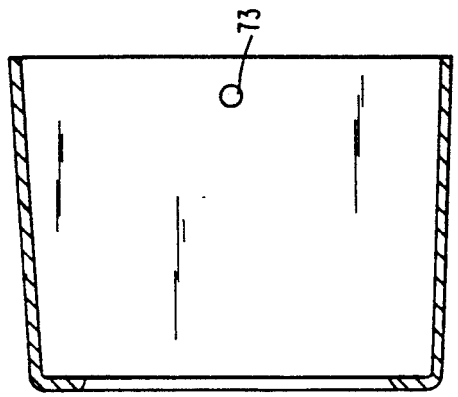
Figure 9A:
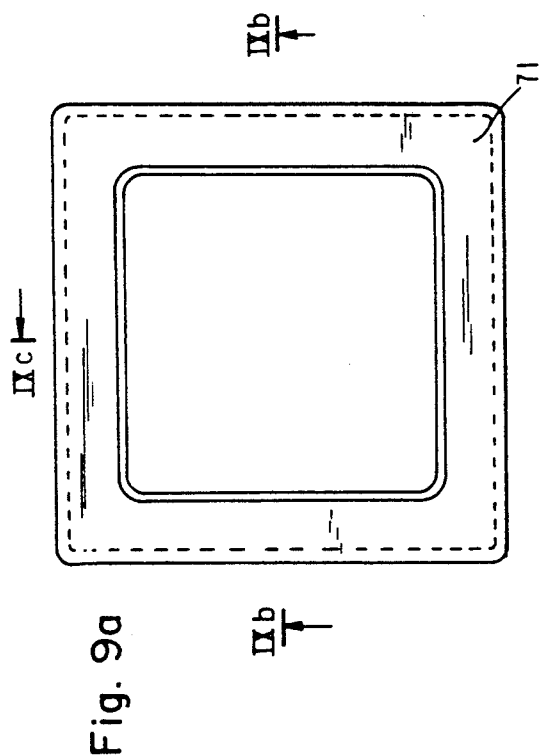
FIG. 9a is a partial front sectional view of a ultrasonic sensor enclosure.
Figure 9B:
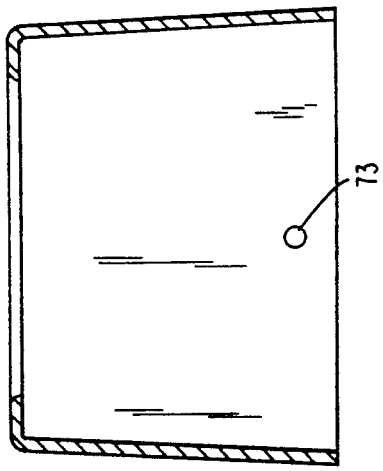
Figure 10A:
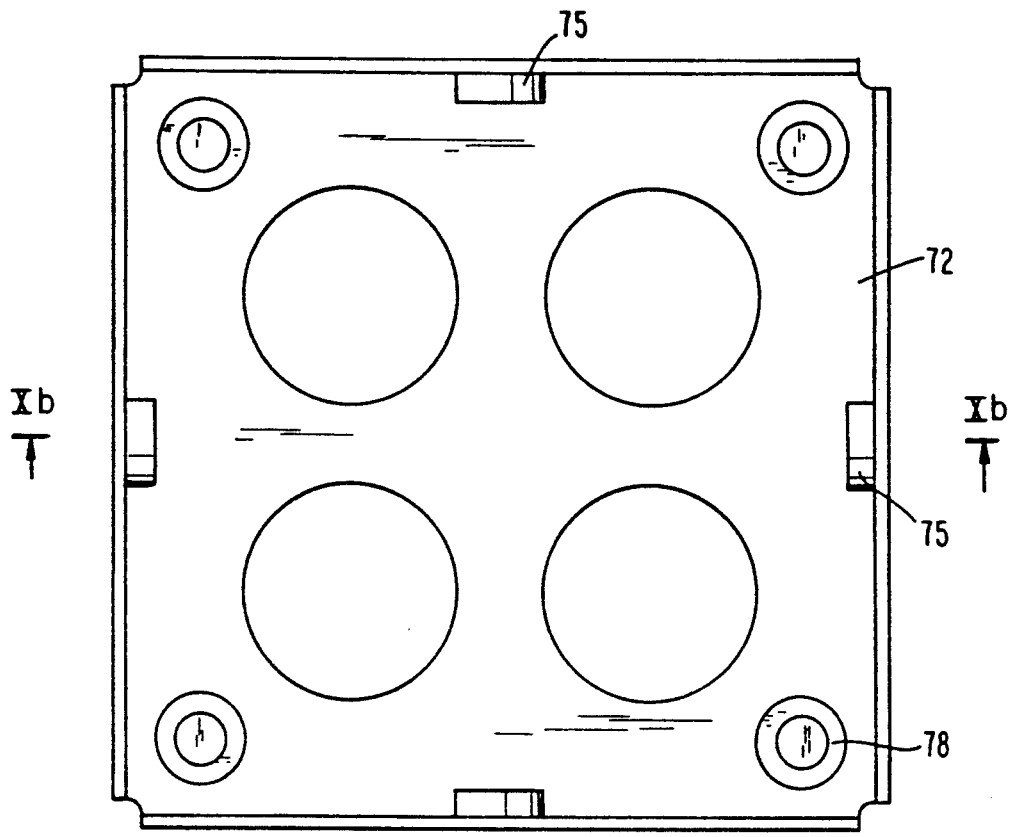
FIG. 10a is a front view of an ultrasonic sensor back panel.
Figure 10B:
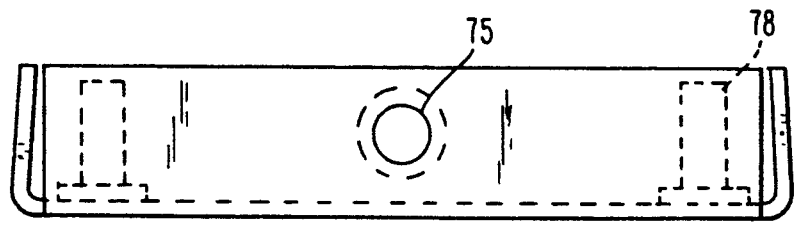

Referring to FIG. 8, transceiver 60 includes housing 70 with ultrasonic transducer 72 mounted therein. Housing 70 is made of conventional sheet metal and includes a box shaped front cover 71 (FIGS. 9a-9c) having an open back and an opposite front. A large square central aperture in the front is covered with an acoustically transparent screen 76 to protect transducer 72 from foreign objects. Cover 71 engages a peripheral lip of square ultrasonic sensor back panel 72 (FIGS. 10a and 10b) and is secured to sensor back panel 72 using bolts inserted through holes 73 of cover 71 engaging corresponding threaded apertures 75 in the lip of back panel 72.

Figure 11A:
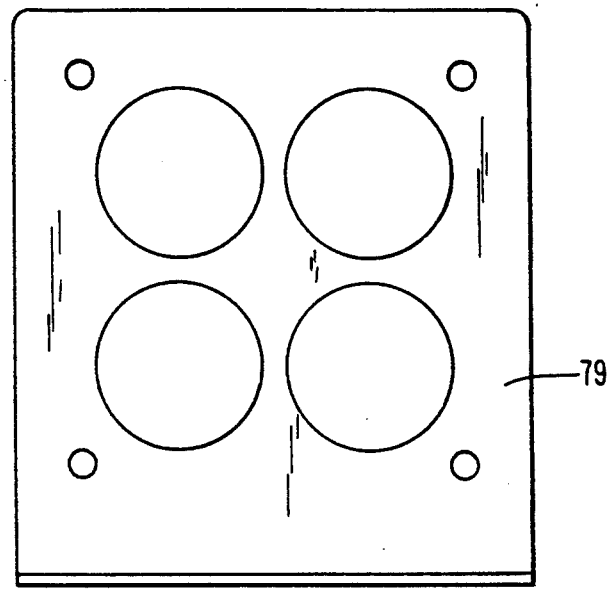
FIG. 11a is a front view of an ultrasonic mounting bracket.
Figure 11C:
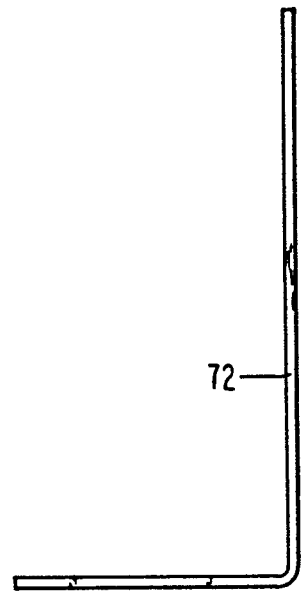
Figure 11B:
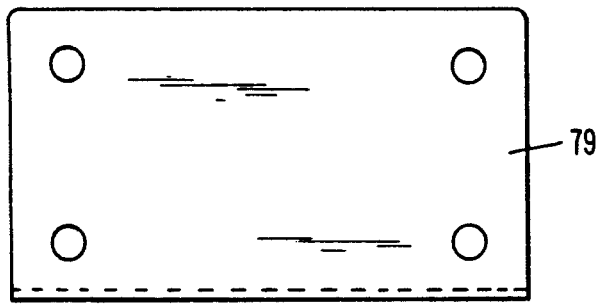

Sensor back panel 72 is secured to a vehicle by through-bolts 78. Alternatively, housing 70 may be attached to a vehicle using L-shaped ultrasonic mounting bracket 79 (FIGS. 11a-11c) which engages and secures to sensor back panel 72 using through bolts 78.

Transducer 72 is centrally positioned within housing 70 by front panel 74. Referring to FIGS. 12a-12c, front panel 74 is formed in the shape of a square with a large central square recessed portion. An oval aperture is formed in the recess portion with a plurality of holes formed thereabout for securing a transceiver to the panel.

Because the ultrasonic transducer is relatively small, it may instead be incorporated into an existing vehicle structure with minimal modification. Light units such as taillight assemblies provide environmental protection for the transducer. The assemblies include an ultrasonic transparent plastic covering as shown in FIGS. 13a and 13b or an aperture through the plastic.

Taillight assembly 130 includes a metallic taillight shell 132 with a peripheral lip for mounting the assembly in an aperture formed in the body of a vehicle. A socket lamp 134 is mounted to shell 132 by a bracket. An incandescent lamp 136 is installed in lamp socket 134 and is supplied with electric power through insulated electric wire 138 to illuminate lamp 136. Transducer 72 is installed below lamp 136 and is supported directly behind lens cover 140 by a conventional bracket member (not shown.)

Lens 140 may be a multifaceted optically translucent plastic material for projecting light emitted from lamp 136. Alternatively, the lens may form a Freznel lens to further direct and concentrate light from lamp 136. The plastic may be optically clear, partially opaque or colored as is conventional for vehicle taillights and running lights. To minimize ultrasonic attenuation, a suitable plastic type and thickness is chosen. Alternatively, an aperture 142 through the plastic or a window area of a suitable ultrasonic transparent material, such as a fine screen material, may be provided in the lens to minimize attenuation of the transmitted and received signals.

Referring to FIG. 14a, vehicle 150 includes a taillight assembly 130 mounted in the rear portion 152 of the vehicle. Thus, the vehicular measuring system may be readily installed in a vehicle by either modifying or replacing an existing taillight to incorporate an ultrasonic transducer without requiring modifications to the structure of the vehicle. Including an ultrasonic transducer in a taillight assembly 130 or running light assembly 154 on a side of the vehicle further accommodates optimal placement of the transducers without removing or relocating existing vehicle lighting.

Figure 15A:
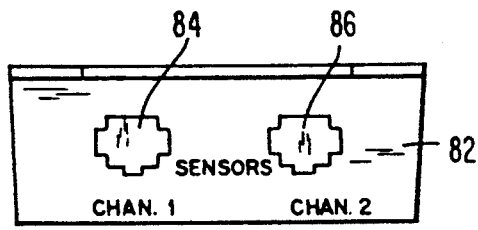
FIG. 15a is a side view of a connection box according to the invention.
Figure 15B:
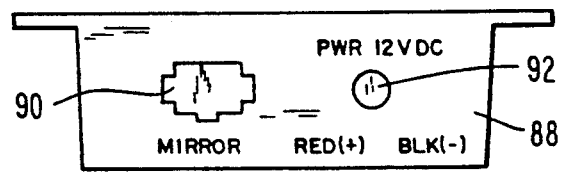
Figure 15C:
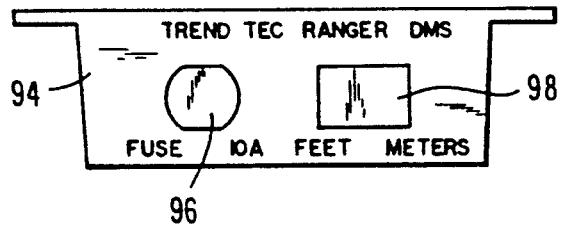
FIG. 15c is a front view of the connection box of FIGS. 15a and 15b.

Referring to FIGS. 15a-15c, connection box 80 includes a first side face 82 including connectors 84 and 86 for connecting electronics contained within the connection box to first and second daisey chained channels of transceivers. An opposite side panel 88 includes a connector 90 accepting cable 82 for supplying signals to mirror display system 40. Connector 92 is used to supply d.c. power to the connection box which distributes power to the other systems as required. Finally, a front panel 94 includes a power fuse holder 96 and a display mode switch 98 for selecting digital display readings in either feet or meters.

Figures 16, 16A:
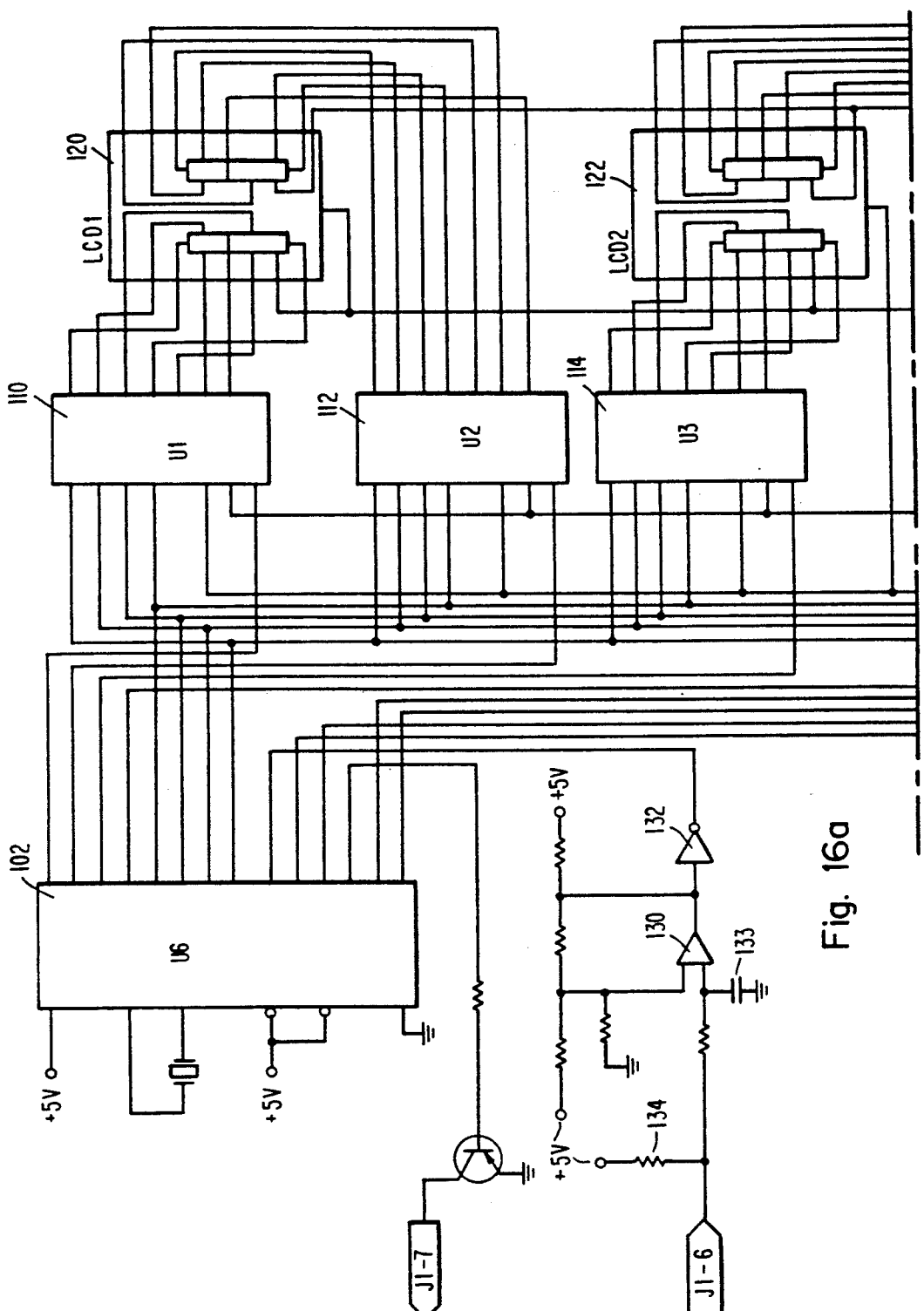
FIGS. 16, 16a and 16b are schematic diagrams of the controller and display electronics of the vehiclular distance measuring system according to the invention.
Figure 16B:
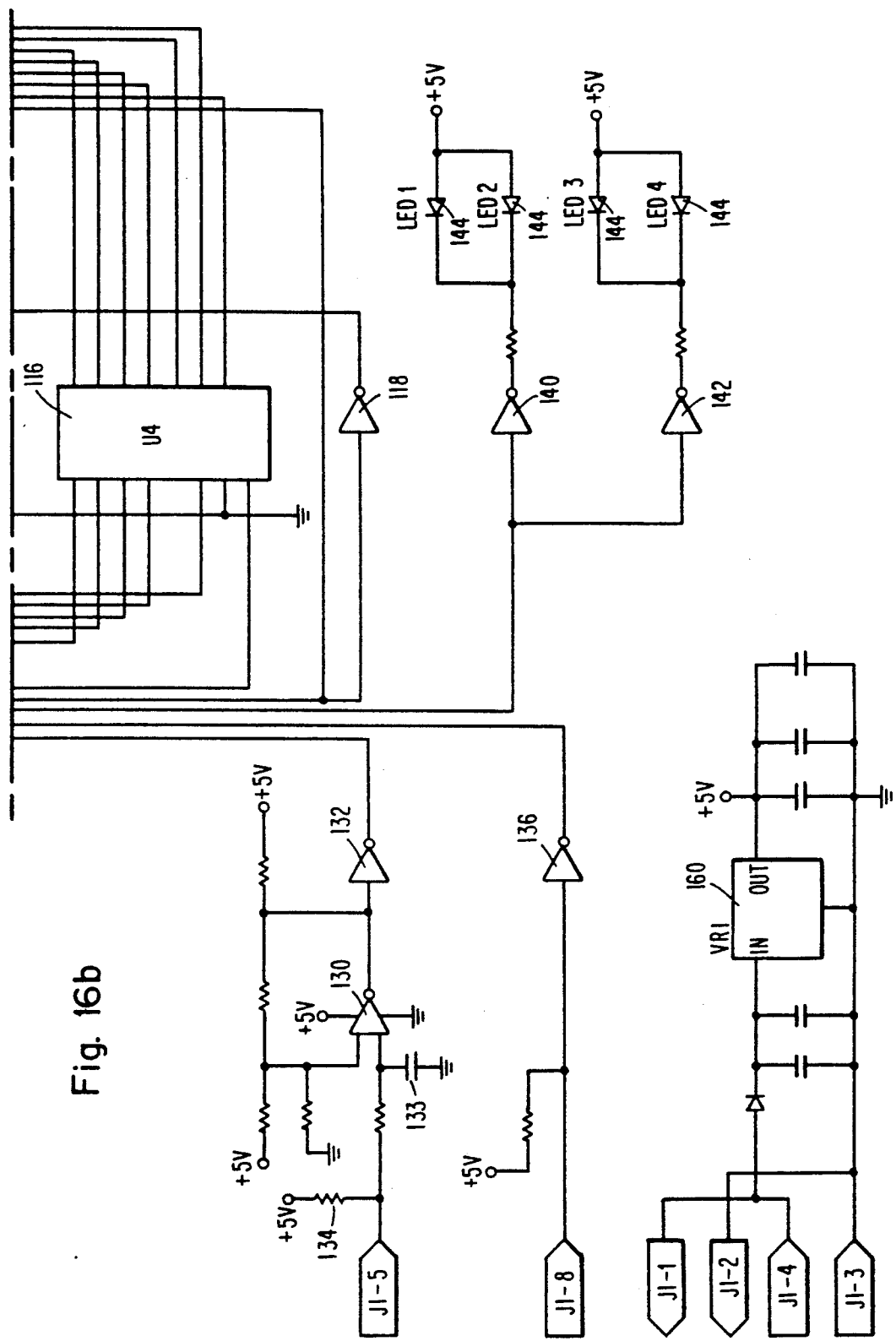

The control electronics housed in connector box 80 and the display electronics of the mirror display system are shown in the schematic diagram of FIG. 16. The controller and display electronics 100 of the vehicular distance measuring system includes a conventional microprocessor 102, binary-coded-decimal (BCD) to seven segment converters/drivers (display drivers) 110-116 and seven-segment liquid crystal displays (LCDs) 120.

Microprocessor 102 includes an on-chip erasable programmable read only memory (EPROM) storing a set of operating instructions, random access memory (RAM) for temporary storage of operating data, a central processing unit for performing arithmetic and logic operations, and first and second parallel input/output (I/O) ports PA0-PA7 and PB0-PB5. First I/O port PA0-PA7 of microprocessor 102 includes I/O terminals PA0-PA3 supplying parallel MOS level BCD data signals to display drivers 110-116. The remaining I/O terminals PA7-PA4 of the first I/O port are connected to respective display enable terminals of display drivers 110-116. Output terminals A-G of display drivers 110-116 are connected to respective segments of dual seven-segment LCD displays 120 and 122.

A first I/O terminal PB0 of the second output port is connected in parallel to light emitting diodes (LEDs) 144 through drivers 140 and 142. LEDs 144 are mounted in the mirror display system behind LCD displays 120 and 122 to illuminate the displays in response to detection of an obstruction within a predetermined threshold distance.

I/O terminal PB1 of the second output port provides a clock signal to display drivers 110-116 and LCD displays 120 and 122 The clock signal is used to synchronize data transfers from the first output port of microprocessor 102 to display drivers 110–116 and LCD displays 120 and 122.

I/O terminal PB2 provides a transmit control signal under program control to each of the transceivers through bipolar transistor Q1. I/O terminal PB3 receives a logic signal from display mode switch 98 through amplifier 136. Microprocessor 102 periodically reads the logic level at I/O terminal PB3 and scales a computed distance to a detected obstruction to selectively display the distance in either feet or meters. Finally, I/O terminals PB5 and PB4 receive respective echo signals ECHO1 and ECHO2 from first and second sensor channels.

Each sensor channel includes a comparator 130 receiving at an inverting input an echo signal from a respective ultrasonic transceivers in parallel comprising a sensor channel. A noise suppression capacitor is connected from the inverting input terminal of comparators 130 to ground. A non-inverting input of the comparator is connected to a reference voltage. If any of the transceivers detect an ultrasonic return echo signal, current is drawn through pull-up resistor 134 connected to the inverting input terminal causing the voltage level applied to the inverting terminal to decrease, i.e., go low with respect to the reference voltage. The output from comparator 130 is supplied to invertor 132 which reinverts the signal level and supplies a respective echo signal to input terminals PB5 and PB4.

Power to all components of electronics 100 is provided by voltage regulator 160. Nominal vehicle 12 volt power is supplied to voltage regulator 160 which supplied five volt MOS operating voltage to system components. Twelve volt direct current is supplied directly to electrical heater units of the mirror display units.

Figure 17:
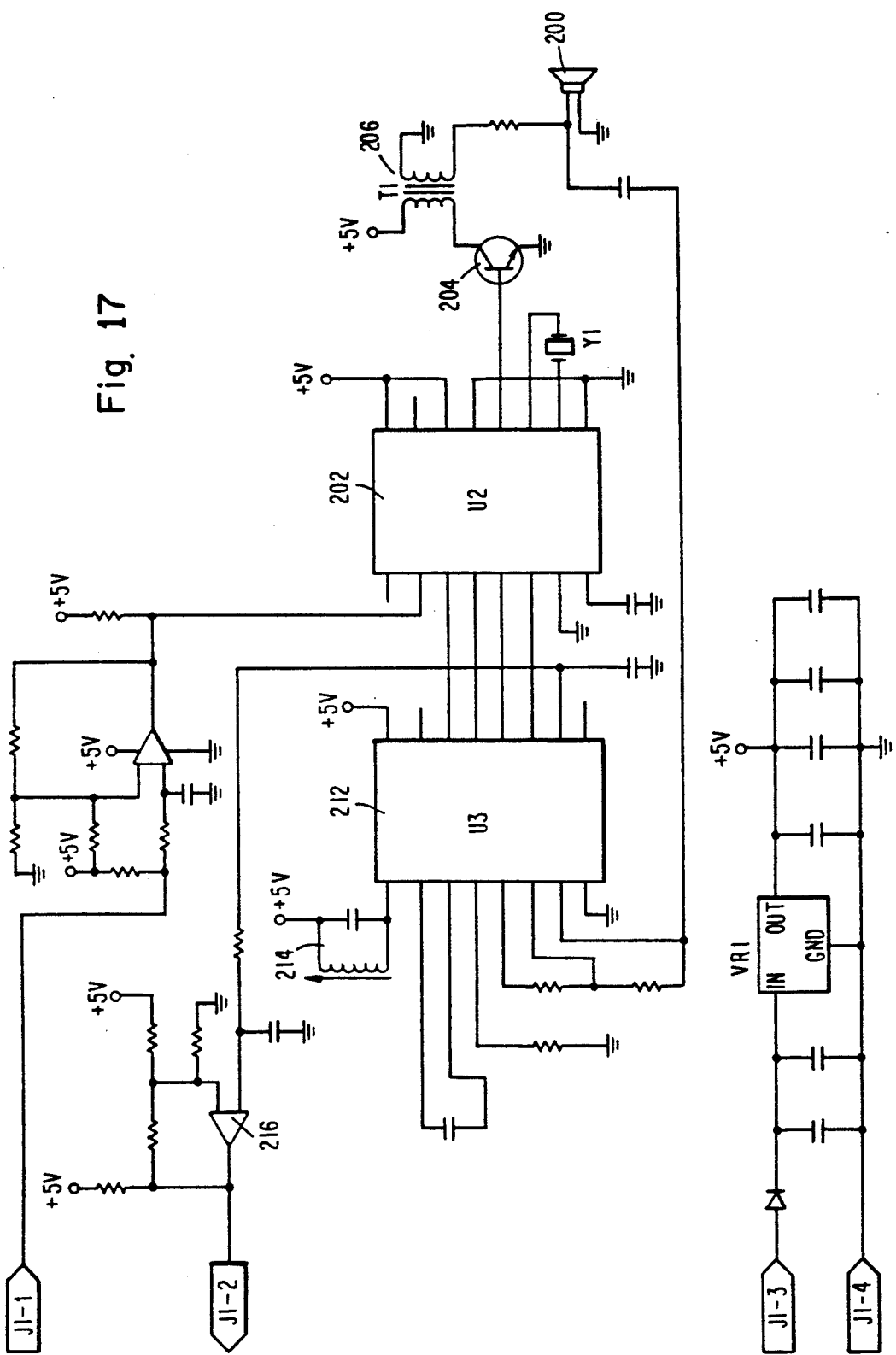
FIG. 17 is a schematic diagram of the ultrasonic transducer and ultrasonic receiver and transmitter circuitry according to the invention.

A schematic diagram of a transceiver including an ultrasonic transducer 200 and ultrasonic receiver and transmitter circuitry is depicted in FIG. 17. The transmitter circuit includes transducer transmit controller 202 which receives a transmit control signal from controller and display electronics 100 and, in response, provides an ultrasonic output signal of a predetermined duration to transducer 200 through output transistor 204 and output transformer 206.

Ultrasonic waves received by transducer 200 are converted to electrical signals and supplied to signal processor 212. Signal processor 212 is responsive to a frequency set by tuned circuit 214 to detect a return echo corresponding to the frequency of the transmitted signal. Upon detecting the predetermined frequency, signal processor 212 supplies a detector signal to an inverting input of comparator 216. The output of comparator 216 is provided in parallel with the output of other transmitters of the channel to controller and display electronics 100.

In operation, microprocessor 102 periodically supplies a transmit control signal in parallel to ultrasonic transceivers of both channels and initiates a timer. In response to the transmit control signal, the transmitters of each transceiver generates an ultrasonic signal causing the respective transducers to emit ultrasonic acoustic wave energy toward areas of potential obstructions or hazards. The acoustic wave energy is bounced off of obstructions, creating an acoustic echo receivable by the transducer.

In response to receiving an acoustic echo, the transducer provides a corresponding electrical signal to signal processor 212. The detector output from signal processor 212 is supplied to microprocessor 102 on a corresponding channel. Microprocessor 102 alternately receives signals from each of the channels and, using the timer, determines a round trip time required for the acoustic wave energy to travel to, and return from the obstruction. The microprocessor translates the time into a distance and compares the computed distance to a predetermined threshold distance value for that channel.

The system has an accuracy and display resolution of one-tenth of a foot over an operating range of 1.5 inches to over ten feet. Distances to objects over ten feet from the vehicle are suppressed in view of system range constraints and to avoid generating spurious warning indications to the operator.

If the computed distance is within a display range corresponding to the threshold distance, microprocessor 102 provides a display output signal indicating distance to the obstruction to the corresponding display channel in the selected units, i.e., feet or meters. If no obstruction to the corresponding display channel is detected within the threshold distance for either channel, both displays are blanked and the illumination therefor is extinguished.

Other features of the inventions include electric heating elements in the mirror display units to defrost, defog and deice the mirrors and to maintain a satisfactory operational environment for the LCD displays. Another feature of the invention includes pellicle mirror portions forming half silvered display windows in the mirror whereby the LCD displays are only visible when back lighted. Blanked displays, being darker than the ambient light level, would not be visible so that the vehicle operator would not be distracted by the display and the full surface area of the mirror unit would constitute usable image area.

In summary, the invention provides an obstruction detection and ranging system including a mirror display unit providing conventional rear view vision to a driver in combination with an integrated digital display. The digital display is viewable through an optical window in the mirror whereby the operator does not redirect his or her vision away from the mirror to observe the display. Because the display is blanked when no object is detected within a predetermined distance from the vehicle, the operator is not distracted by spurious indications on the display.

While there have been described and illustrated several specific embodiments of the invention, it will be clear that variations in the details of the embodiments specifically illustrated and described may be made without departing from the true spirit and scope of the invention as defined in the appended claims.

For example, although the mirror display system is described using LCDs. light emitting diode displays may be substituted thereby eliminating the need for separate backlighting LEDs. Further, although the system is described including two channels of sensors, fewer or greater number of channels may be incorporated to provide a desired hazard warning detection zone. Still further, although ultrasonic ranging is described, other ranging systems may be used including radio detection and ranging (radar), infrared and radio transponder systems.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A vehicular distance measuring system, comprising:
   a distance measuring device arranged to detect a distance to an object and, in response, to output a distance signal; and
   a display structure including
   (i) a vehicular mirror having an image reflecting surface with a window portion located therein, and
   (ii) a digital display mounted on said vehicular mirror and viewable through said window portion, said digital display being activated in continuous response to said distance signal for displaying the detected distance to the object.

2. A vehicular distance measuring system, comprising:
   a distance measuring device arranged to detect a distance to an object and, in response, to output a distance signal; and
   a display structure including
   (i) a vehicular mirror having an image reflecting surface with a window portion located therein, and
   (ii) a digital display mounted on said vehicular mirror and viewable through said window portion, said digital display being activated in continuous response to said distance signal for displaying the detected distance to the object; and,
   a combination vehicular light and sensor housing including
   (i) a shell,
   (ii) a light emitter mounted in said shell for supplying visible light,
   a transducer mounted in said shell for emitting and receiving a probe signal for measuring said distance to said object, and
   (iv) a lens mounted to said shell for transmitting said visible light.

3. The vehicular distance measuring system according to claim 2 wherein said lens includes an aperture aligned with said transducer.

4. A vehicular distance measuring system, comprising:
   a distance measuring device arranged to detect a distance to an object and, in response, to output a distance signal; and
   a display structure including
   (i) a vehicular mirror having an image reflecting surface with a window portion located therein, and
   (ii) a digital display mounted on said vehicular mirror and viewable through said window portion, said digital display being activated in continuous response to said distance signal for displaying the detected distance to the object; and,
   means for comparing the distance to the object with a predetermined threshold distance and, in response, supplying a display unblank signal, said digital display responsive to said display unblank signal for selectively (i) blanking the digital display and (ii) displaying the detected distance to the object.

5. The vehicular distance measuring system according to claim 4, said display further comprising an illumination source responsive to said display unblank signal for illuminating said digital display.

6. The vehicular distance measuring system according to claim 1, wherein said distance measuring device includes:
   an ultrasonic transceiver responsive to a transmit signal for emitting an ultrasonic wave and for receiving a reflected ultrasonic wave and, in response, supplying a received signal;
   timing circuitry for measuring a time period between the emission of the ultrasonic wave by said ultrasonic transmitter and reception of said reflected ultrasonic wave by said ultrasonic transceiver; and
   distance conversion circuitry responsive to said measured time period for supplying said distance signal.

7. A vehicular distance measuring system, comprising:
   a distance measuring device arranged to detect a distance to an object and, in response, to output a distance signal; and
   a display structure including
   (i) a vehicular mirror having an image reflecting surface with a window portion located therein, and
   (ii) a digital display mounted on said vehicular mirror and viewable through said window portion, said digital display being activated in continuous response to said distance signal for displaying the detected distance to the object;
   an ultrasonic transceiver responsive to a transmit signal for emitting an ultrasonic wave and for receiving a reflected ultrasonic wave and, in response, supplying a received signal;
   timing circuitry for measuring a time period between the emission of the ultrasonic wave by said ultrasonic transmitter and reception of said reflected ultrasonic wave by said ultrasonic transceiver;
   distance conversion circuitry responsive to said measured time period for supplying said distance signal; and,
   a combination vehicular light and sensor housing including
   (i) a shell,
   (ii) light emitting source mounted in said shell for supplying visible light,
   (iii) means for mounting said ultrasonic transceiver in said shell, and
   (iv) a lens mounted to said shell for transmitting said visible light.

8. The vehicular distance measuring system according to claim 1, where said digital display is electronic and includes a binary-coded-decimal (BCD) decoder receiving said distance signal and, in response, supplying a display driver signal, said electronic digital display responsive to said display driver signal for displaying said detected distance to the object.

9. The vehicular distance measuring system according to claim 8, wherein said electronic digital display comprises a pair of liquid crystal displays (LCDs).

10. The vehicular distance measuring system according to claim 8, wherein said electronic digital display comprises a pair of light emitting diode displays (LEDs.)

11. The vehicular distance measuring system according to claim 1, wherein said display includes mounting means attaching said display to an outer portion of a vehicle.

12. The vehicular distance measuring system according to claim 1, further comprising heater means for electrically heating said vehicular mirror.

13. The vehicular distance measuring system according to claim 1, wherein said window comprises a pellicular mirror.

14. The vehicular distance measuring system according to claim 1, wherein said window is transparent.

15. A vehicular distance measuring system, comprising:
   a distance measuring device including
      (i) a first sensor channel for detecting a distance to an object located in a first space and, in response, supplying a first sensor signal, and
      (ii) a processor responsive to said first sensor channel for supplying a first distance signal; and
   a distance display system including
      (i) a vehicular side view mirror mounted on the exterior of this vehicle having an image reflecting surface and a first window located in a portion of said image reflecting surface, and
      (ii) a first digital display mounted on said vehicular side view mirror, said numeric display visible through said first transparent window and activated in continuous response to said first distance signal for displaying the detected distance to the object.

16. A vehicular distance measuring system, comprising:
   a distance measuring device including
      (i) a first sensor channel for detecting a distance to an object located in a first space and, in response, supplying a first sensor signal, and
      (ii) a processor responsive to said first sensor channel for supplying a first distance signal; and
   a distance display system including
      (i) a vehicular side view mirror mounted on the exterior of this vehicle having an image reflecting surface and a first window located in a portion of said image reflecting surface, and
      (ii) a first digital display mounted on said vehicular side view mirror, said numeric display visible through said first transparent window and activated in continuous response to said first distance signal for displaying the detected distance to the object;
   wherein said processor supplies an unblank display signal to said numeric display in response to detecting the object within a predetermined distance, said first digital display is responsive to said unblank display signal for selectively blanking and displaying said detected distance.

17. The vehicular distance measuring system according to claim 16, said first digital display comprises an electronic display and a display illumination source responsive to said unblank display signal from said distance measuring means for illuminating said electronic digital display.

18. The vehicular distance measuring system according to claim 17, wherein said first electronic digital display is selectively actuated in response to said unblank display signal with a detected distance greater than said predetermined distance and displays the detected distance less than said predetermined distance.

19. The vehicular distance measuring system according to claim 16, said distance display system further comprising a display illumination source responsive to a signal from said processor for illuminating said electronic digital display.

20. The vehicular distance measuring system according to claim 16,
   said distance measuring device including a second sensor channel for detecting a distance to an object located in a second space and, in response, supplying a second sensor signal, said processor responsive to said second sensor channel for supplying a second distance signal;
   said vehicular rear view mirror having a second window located in a portion of said image reflecting surface spaced from said first window, and a second digital display mounted on said vehicular rear view mirror, said second digital display being visible through said second transparent window and responsive to said second distance signal for displaying the second detected distance.

21. The vehicular distance measuring system according to claim 20, said distance measuring device including display blanking means for selectively blanking said first and second digital displays in response to no object being detected by said respective first and second sensor channels within predetermined threshold distances.

22. The vehicular distance measuring system according to claim 21, further comprising display illumination means for selectively illuminating said first and second numeric displays in response to said first and second sensor channels respectively detecting an object within said predetermined threshold distances.

23. The vehicular distance measuring system according to claim 16, said first sensor channel comprising:
   an ultrasonic transmitter responsive to a transmit signal for emitting an ultrasonic wave;
   an ultrasonic receiver for receiving a reflected ultrasonic wave and, in response, supplying a received signal;
   timing circuitry for measuring a time period between the emission of the ultrasonic wave by said ultrasonic transmitter and reception of said reflected ultrasonic wave by said ultrasonic receiver; and
   distance conversion circuitry responsive to said measured time period for supplying said distance signal.

24. The vehicular distance measuring system according to claim 15, wherein said first window comprises a pellicular mirror.

25. The vehicular distance measuring system according to claim 15, wherein said first window is transparent.

26. A vehicular distance measuring system mounted in a vehicle for detecting a distance to an object, comprising:
   control circuitry for supplying a transmit signal and, responsive to a received echo signal, supplying a distance signal;
   ultrasonic transducer means mounted on an exterior surface of said vehicle and responsive to said transmit signal for emitting an ultrasonic wave and for receiving a reflected ultrasonic wave and, in response, supplying said received echo signal;
   a side view mirror mounted outside of said vehicle for observing an object at a rear of the vehicle, said side view mirror including a reflective surface; and
   an electronic digital display mounted on said side view mirror and observable through a window in said reflective surface, said numeric display responsive to said distance signal for displaying numeric distance data.

27. The vehicular distance measuring system according to claim 26, said control means including display blanking means responsive to said received echo signal for blanking said electronic digital display whereby display of numeric data by said electronic digital display is suppressed responsive to no object being detected within a predetermined threshold distance from the vehicle.

28. A vehicular light and sensor housing assembly, comprising:
a vehicular mountable shell;
light emitting means mounted in said shell for supplying visible light;
a transducer mounted in said shell for emitting and receiving a probe signal for measuring a distance; and
a lens mounted to said shell for transmitting said visible light and said probe signal.

29. The vehicular light and sensor housing assembly according to claim 28 wherein said probe signal comprises ultrasonic wave energy.

30. The vehicular light and sensor housing assembly according to claim 28, further comprising means for sealing said lens to said shell to prevent entry of contaminants into said housing.

31. The vehicular light and sensor housing assembly according to claim 28 wherein said transducer includes means to transmitting and receiving ultrasonic wave energy.

32. The vehicular light and sensor housing assembly according to claim 31 wherein said lens includes an aperture aligned with said transducer.

33. The vehicular light and sensor housing assembly according to claim 31 wherein said lens comprises a plastic cover translucent to said visible light with a window portion substantially transparent to said ultrasonic wave energy.

34. The vehicular light and sensor housing assembly according to claim 28, further including means for mounting said shell to an exterior of a motor vehicle.

35. The vehicular light and sensor housing assembly according to claim 28 wherein said light emitting means comprises and incandescent lamp and means for supplying electric power to said incandescent lamp.

36. A vehicular position monitoring system comprising:
at least one sensor mounted on an exterior of a vehicle and having an output;
a processor arranged to derive information from said output of said at least one sensor indicative of vehicle position;
at least one vehicular mirror having a reflecting surface; and
a display mounted within said mirror to be visible through an aperture in said reflecting surface, said display being activated in continuous response to the output of said sensor.

37. The vehicular position monitoring system of claim 36, further comprising means for maintaining said aperture in a reflective condition when said display is not activated.

38. The vehicular position monitoring system of claim 37, wherein said means for maintaining said aperture in a reflective state comprises a pellicular mirror.

39. A vehicular distance measuring system, comprising:

a distance measuring device arranged to detect a distance to an object and, in response, to output a distance signal; and
a display structure including:
(i) a vehicular mirror having an image reflecting surface with an aperture located therein, and
(ii) an electronic digital display mounted in said vehicular mirror in a position substantially offset from the latitudinal axis of said mirror, said electronic digital display being viewable through said aperture and activated responsive to said distance signal so as to display the detected distance to the object.

40. The vehicular distance measuring system of claim 39, wherein said vehicular mirror is arranged as a rear view mirror within said vehicle.

41. The vehicular distance measuring system of claim 39, wherein said vehicular mirror is arranged as a side view mirror mounted on the exterior of the vehicle.

42. A vehicular distance measuring system, comprising:
a distance measuring device arranged to detect a distance to an object and, in response, to output a distance signal, said distance measuring device comprising:
means for comparing the distance to the object with a predetermined threshold distance and, in response, supplying a display unblank signal; and
a display structure including
(i) a vehicular mirror having an image reflecting surface with an aperture located therein, and
(ii) an electronic digital display mounted in said vehicular mirror and viewable through said aperture portion, said electronic digital display being responsive to said distance signal for displaying the detected distance to the object, and being responsive to said display unblank signal for selectively displaying the detected distance to the object.

43. The vehicular distance measuring system of claim 42, wherein said display structure further comprises an illumination source responsive to said display unblank signal for illuminating said electronic digital display.

44. The vehicular distance measuring system of claim 43, wherein said vehicular mirror is arranged as a rear view mirror.

45. The vehicular distance measuring system of claim 43, wherein said vehicular mirror is arranged as a side view mirror mounted to the exterior of said vehicle.

46. The vehicular position monitoring system of claim 36, further comprising at least one additional aperture and one additional display mounted so as to be visible through said aperture in said reflecting surface.

47. A vehicular distance measuring system, comprising:
a distance measuring device arranged to detect a distance to an object and, in response, to output a distance signal; and
a display structure including
(i) a vehicular mirror having an image reflecting surface with an aperture located therein,
(ii) an electronic digital display mounted in said vehicular mirror and viewable through said aperture, said electronic digital display responsive to said distance signal for displaying the detected distance to the object, and
(iii) means for maintaining said aperture in a reflective state when said display is not activated.

48. The vehicular distance measuring system of claim 47, wherein said means for maintaining said aperture in a reflective state comprises a pellicular mirror.

49. The vehicular distance measuring system of claim 47, wherein said vehicular mirror is arranged as a rear view mirror inside of said vehicle.

50. The vehicular distance measuring system of claim 47, wherein said vehicular mirror is arranged as a side view mirror mounted on the exterior of said vehicle.

51. The vehicular distance measuring system of claim 47, wherein said aperture is substantially offset from the latitudinal axis of said vehicular mirror.

52. The vehicular position monitor system of claim 47, wherein all of said apertures are substantially offset from the latitudinal axis of the vehicular mirror.

53. The vehicular position monitoring system of claim 36, wherein said display comprises an electronic display.

54. A method of monitoring objects behind a vehicle comprising the steps of:
   (a) backing said vehicle;
   (b) receiving signals corresponding to objects behind said vehicle responsive to backing said vehicle;
   (c) processing said signals into data indicative of said objects; and
   (d) displaying said data on a rear view mirror of said vehicle continuously responsive to said signals.

* * * * *